US006968886B2

(12) United States Patent
Berry et al.

(10) Patent No.: US 6,968,886 B2
(45) Date of Patent: Nov. 29, 2005

(54) SECTIONAL DOOR WITH COMBINATION HINGE PIN AND REINFORCING MEMBER

(75) Inventors: Robert E. Berry, Marion, OH (US); Charles Frederick Kellogg, Marion, OH (US); Larry Walter Brim, Kenton, OH (US)

(73) Assignee: Overhead Door Corporation, Farmers Branch, TX (US)

( * ) Notice: Subject to any disclaimer, the term of this patent is extended or adjusted under 35 U.S.C. 154(b) by 0 days.

(21) Appl. No.: 10/620,983

(22) Filed: Jul. 16, 2003

(65) Prior Publication Data

US 2005/0011619 A1   Jan. 20, 2005

(51) Int. Cl.[7] ............................................. E05D 15/16
(52) U.S. Cl. ...................... 160/201; 160/229.1; 16/234
(58) Field of Search .......................... 160/201, 229.1, 160/236; 16/234, 365, 308, 380

(56) References Cited

U.S. PATENT DOCUMENTS

| 1,954,934 | A | * | 4/1934 | Houdaille et al. ............. 16/308 |
| 3,347,305 | A | * | 10/1967 | Urbanick ...................... 160/40 |
| 4,949,772 | A | * | 8/1990 | Ballyns et al. ............... 160/201 |
| 4,953,260 | A | * | 9/1990 | Fargnier ....................... 16/308 |
| 6,056,037 | A | * | 5/2000 | Jonkman et al. ............ 160/207 |
| 6,463,988 | B1 | * | 10/2002 | Mullet et al. ............... 160/201 |

* cited by examiner

Primary Examiner—Blair M. Johnson
(74) Attorney, Agent, or Firm—Gardere Wynne Sewell LLP

(57) ABSTRACT

Sectional upward acting doors used in vehicle cargo bodies are provided with multiple generally planar door panels which are interconnected by spaced apart hinge assemblies. At least selected intermediate hinge assemblies are provided with hinge pin receiving bosses to receive elongated hinge pins extending between adjacent hinge assemblies and secured thereto. The hinge pins preferably comprise elongated cylindrical rods which form hinge pins for adjacent hinge assemblies and extend between adjacent hinge assemblies to form a reinforcing member to minimize lateral deflection of the door panels.

5 Claims, 2 Drawing Sheets

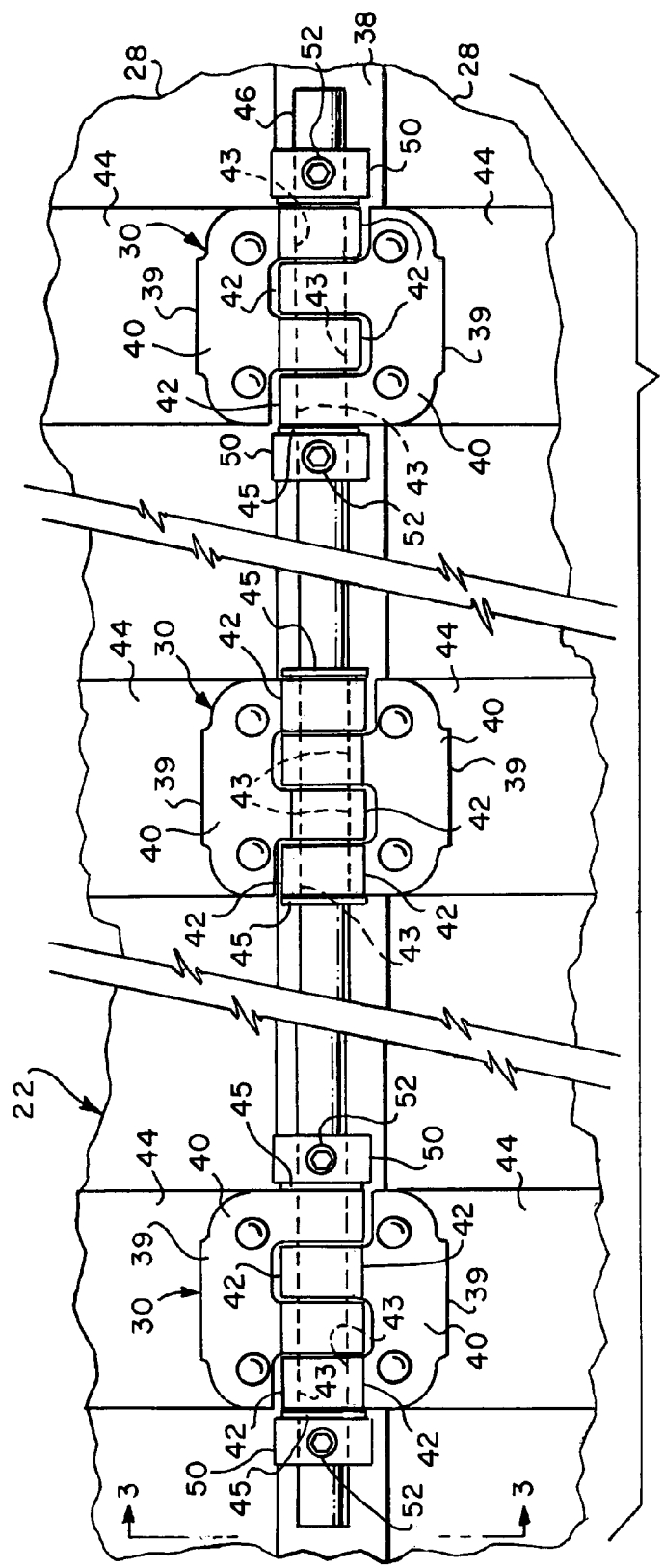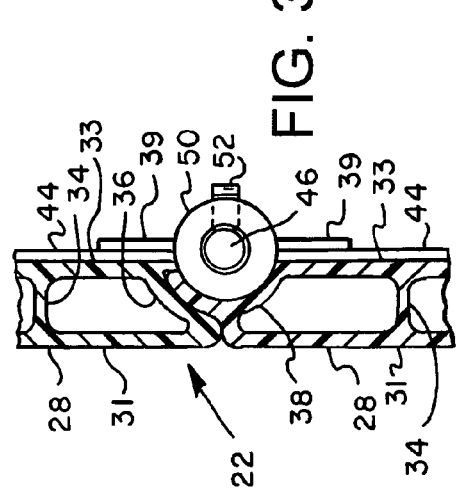

SECTIONAL DOOR WITH COMBINATION HINGE PIN AND REINFORCING MEMBER

BACKGROUND OF THE INVENTION

Sectional upward acting doors are ubiquitous in applications for cargo bodies of freight vehicles, including motor trucks, for example. Mobile cargo bodies are, of necessity, fabricated of components which are as light in weight as practical in order to reduce the tare weight of the vehicle. Sectional upward acting doors for cargo bodies are preferably manufactured of lightweight extruded materials including aluminum and plastics. However, one problem associated with the design and manufacture of sectional doors pertains to the stiffness of the door panels required to resist damaging deflections due to rough treatment, windloads and impacts from shifting cargo. Accordingly, efforts to fabricate sectional doors to be as light in weight as possible are at cross purposes with efforts to make the doors structurally stiff and rugged.

Upward acting sectional doors of the type described above are typically fabricated with multiple panels that are interconnected by spaced apart hinge assemblies. Such hinge assemblies are typically formed by opposed hinge plates which are, preferably, provided with hinge bearing pins interconnecting the opposed plates to form the hinge connection between door panels or sections. In accordance with the present invention, the problem arising from the lack of stiffness of sectional door panels for mobile cargo bodies has been overcome by utilizing the hinge connections between adjacent panels in an improved manner.

SUMMARY OF THE INVENTION

The present invention provides an improved sectional, upward acting door, particularly useful for cargo bodies for freight vehicles including motor trucks, for example.

In accordance with one aspect of the present invention, a sectional upward acting door is provided which includes multiple door panels interconnected by spaced apart hinge assemblies between adjacent panels and wherein the hinge assemblies include elongated hinge pins or rods which extend between two or more adjacent hinges and form a reinforcing member to improve the stiffness and reduce unwanted deflection of the sectional door panels.

In accordance with a further aspect of the present invention there is provided a lightweight sectional upward acting door formed of hingedly interconnected door panels which include opposed hinge plates mounted on adjacent panels and interconnected by a hinge pin or rod member, which may extend between multiple adjacent hinges to provide an elongated stiffening member and which is retained connected to the hinges by spaced apart removable collars. The collars may be easily removed for repair or replacement of the hinge pins, the hinge members or the door panels, as required.

Those skilled in the art will recognize the above-mentioned features and advantages of the invention, together with other important aspects thereof upon reading the detailed description which follows in conjunction with the drawings.

BRIEF DESCRIPTION OF THE DRAWINGS

FIG. 2 is a detail view showing the arrangement of the hinge plates mounted on adjacent door sections with the combination hinge pin and reinforcing member extending therethrough; and FIG. 3 is detail section view taken generally along the line 3—3 of FIG. 2.

DETAILED DESCRIPTION OF A PREFERRED EMBODIMENT

Figure 1:
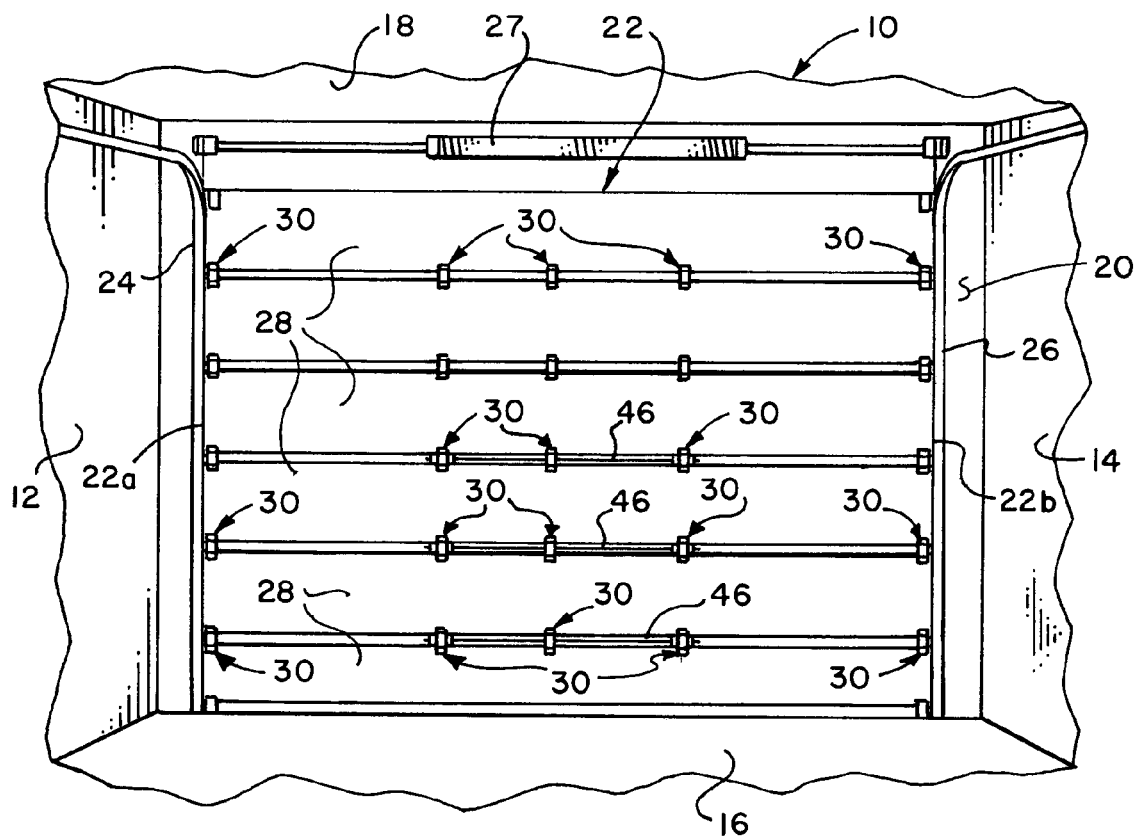
FIG. 1 is a perspective view of a sectional upward acting door for a mobile cargo body including the combination hinge pin and reinforcing member arrangement of the present invention.

In the description which follows, like parts are marked throughout the specification and drawing with the same reference numerals, respectively. The drawing figures are not necessarily to scale and certain features may be shown in generalized or somewhat schematic form in the interest of clarity and conciseness.

Referring to FIG. 1, there is shown a portion of a cargo body 10 of a mobile freight or cargo vehicle such as a motor truck, viewed from the interior thereof. The cargo body 10 includes opposed side walls 12 and 14, a floor 16 and a ceiling 18. An outer wall 20 interconnects the other walls of the cargo body. An opening in wall 20 is closed by a sectional upward acting door 22 which may be of somewhat conventional construction except as described herein. The door 22 is mounted on opposed sets of guide rollers, not shown, for guidance and support by opposed track assemblies 24 and 26 in a conventional manner for movement between a closed position, as shown in FIG. 1, and an open upwardly acted position, not shown. A conventional counterbalance mechanism 27 may be mounted on wall 20 above the door 22 for assisting a person in opening the door. The door 22 is formed of plural interconnected lightweight sections or panels 28 which are interconnected by spaced apart hinge assemblies 30, five shown for each pair of interconnected panels, by way of example in FIG. 1.

Referring briefly to FIG. 3, the panels 28 are, by way of example, formed of extruded plastic and are characterized by generally planar members having opposed outer and inner walls 31 and 33 which are interconnected by internal webs 34 and upper and lower transverse edges 36 and 38 which may be configured to interfit in a way such as to form a substantially weathertight seal between door panels and also be pinch resistant.

As shown in FIGS. 2 and 3, the hinge assemblies 30 include opposed hinge plates 39, which may be identical in construction and each include a generally planar plate-like portion 40 and spaced apart generally cylindrical bosses 42 integrally formed with the plate-like portions 40. The hinge plates 39, may, for example, be formed of cast metal or plastic. The hinge plates 39 may be mounted on relatively planar reinforcing members 44 suitably secured to each of the panels 28 to form a force distributing member. Each of the bosses 42 is provided with a cylindrical bearing bore 43 formed therein for receiving a hinge pin to form the hinge assembly. At least selected ones of the bearing bores 43 may be fitted with flanged tubular bearing bushings 45, as shown.

Referring again to FIG. 1, hinge assemblies 30 are provided at the opposite side edges 22a and 22b of the door 22 and the hinge pins for these hinge assemblies may, for example, be cylindrical stems of conventional guide members, not shown, for guiding the door 22 for movement along tracks 24 and 26 between open and closed positions and for supporting the door in its respective positions.

However, a hinge pin for certain ones of the intermediate sets of hinges 30, three shown in the example of FIG. 1, preferably comprises an elongated generally cylindrical member 46. In the example shown in FIG. 1, the door 22 is formed by six interconnected panels 28 and the three intermediate hinge assemblies 30 interconnecting the four lowermost panels are provided with a single elongated combination hinge pin and door reinforcing member 46 extending between the intermediate hinge assemblies, as shown.

As shown in FIGS. 1 and 2, each elongated hinge pin and reinforcing member 46 extends entirely through the bearing bores of the center hinge assembly 30, and entirely through the bearing bores of the hinge plates 39 of the intermediate hinge assemblies 30 on both sides of the center hinge assembly. The hinge pin members 46 are retained in assembly with the hinge assemblies 30 by removable, generally cylindrical collars 50, see FIGS. 2 and 3, which are mounted adjacent the outermost bosses 42 of the opposed hinge plates 38. The collars 50 are suitably secured to the hinge pins 46 by conventional set screws 52, as shown.

Accordingly, the door 22 is stiffened by the provision of the elongated combination hinge pin and reinforcing members 46 which extend at least between adjacent hinges which interconnect adjacent sectional door panels. In this way lateral deflection of the panels 28 is minimized while at the same time the arrangement provided by the combination hinge pin and reinforcing members 46 provides the hinge connection function between door panels. Those skilled in the art will recognize that the door 22 is exemplary with respect to the number of intermediate hinges 30 and that only two intermediate hinges may be provided on doors having a reduced width while wider doors may require more than the three intermediate hinge assemblies 30, as shown by the example in the drawing figures. The combination hinge pin and reinforcing members 46 may be formed of suitable engineering materials, such as steel or aluminum cylindrical rod stock, and the bushings 45, if required may be formed of a suitable and compatible bearing material. For a typical upward acting motor truck cargo body sectional door, the pin diameter may be on the order of about 0.50 inches, for example. Accordingly, a solution to the problem of fabricating sectional door panels for cargo bodies of low density materials which would otherwise be susceptible to unwanted lateral deflection in cargo door body applications is provided by the hinge pin and reinforcing members 46 in combination with the hinge assemblies formed by the opposed hinge plates 39. Those skilled in the art will recognize that the hinge plates 39 are primarily exemplary and suitable hinge plates may be formed with only one pin receiving boss or more than the two pin receiving bosses shown by way of example in the drawing figures. Conventional engineering materials and fabrication techniques may be used to fabricate the door 22.

Although a preferred embodiment of the invention has been described in detail above and illustrated in the accompanying drawings, those skilled in the art will recognize that various substitutions and modifications may be made without departing from the scope and spirit of the appended claims.

What is claimed is:

1. A sectional upward acting door for a vehicle cargo body comprising:
    a plurality of generally planar panel members having respective opposed edges, adjacent panel members being interconnected by spaced apart and separate hinge assemblies, at least three adjacent hinge assemblies interconnecting adjacent panels each including opposed hinge members, said hinge members each including hinge pin receiving bores, respectively;
    an elongated pin member forming a hinge pin for each of said adjacent hinge assemblies, respectively, said pin member comprising a generally cylindrical rod extending within said bores formed in and engaged with each of said hinge members of each of said adjacent hinge assemblies and extending between said adjacent hinge assemblies to provide a reinforcing member for resisting lateral deflection of said panel members of said door;
    respective first collars secured to said pin member at opposite ends thereof; and
    second collars secured on said pin member at points spaced from respective ones of said first collars and on an opposite side of a hinge assembly, respectively.

2. The door set forth in claim 1 wherein:
    at least one of said collars is retained on said pin member by a setscrew.

3. A sectional door for a cargo body comprising:
    a plurality of generally planar panel members having respective opposed edges, adjacent panel members being interconnected by spaced apart separate hinge assemblies, at least a pair of adjacent hinge assemblies interconnecting adjacent panels each including opposed hinge members, said hinge members including hinge pin receiving parts, respectively;
    an elongated pin member forming a hinge pin for said adjacent hinge assemblies and extending between said adjacent hinge assemblies to provide a reinforcing member for said door, said pin member is retained extending between said adjacent hinge assemblies by respective first collars secured to said pin member at opposite ends thereof; and
    second collars are secured on said pin member at points spaced from respective ones of said first collars and on an opposite side of a hinge assembly, respectively.

4. A sectional upward acting door for a vehicle cargo body comprising:
    a plurality of generally planar panel members having respective opposed edges, adjacent panel members being interconnected by spaced apart separate hinge assemblies, at least a pair of adjacent hinge assemblies interconnecting adjacent panels each including opposed hinge plates, said hinge plates including hinge pin receiving parts, respectively;
    an elongated cylindrical pin member forming a hinge pin for said adjacent hinge assemblies and extending between said adjacent hinge assemblies and through said pin receiving parts of said hinge plates, respectively, to provide a reinforcing member for said door, said pin member is retained extending between said adjacent hinge assemblies by respective first collars secured to said pin member at opposite ends thereof, at least one of said collars is retained on said pin member by a setscrew; and
    second collars are secured on said pin member at points spaced from respective ones of said first collars and on an opposite side of a hinge assembly, respectively.

5. A sectional upward acting door for a vehicle cargo body comprising:
    a plurality of generally planar panel members having respective opposed edges, adjacent panel members being interconnected by spaced apart and separate hinge assemblies, at least three adjacent hinge assemblies interconnecting adjacent panels each including opposed hinge members, said hinge members including hinge pin receiving bores, respectively;
    an elongated pin member forming a hinge pin for said adjacent hinge assemblies, said pin member comprising a generally cylindrical rod extending within said bores formed in hinge members of said adjacent hinge assemblies and extending between said adjacent hinge assemblies to provide a reinforcing member for said door;

respective first collars secured to said pin member at opposite ends thereof; and second collars secured on said pin member at points spaced from respective ones of said first collars and on an opposite side of a hinge assembly, respectively.

* * * * *